United States Patent [19]

Suzuki et al.

[11] Patent Number: 5,545,467

[45] Date of Patent: Aug. 13, 1996

[54] PAPER ADDITIVE FOR HOT-PRESSED FORMS AND HOT-PRESSED FORMS USING IT

[75] Inventors: Isao Suzuki; Sunao Matsushima; Yoshikazu Kubota; Masayasu Kamijyou, all of Fuji, Japan

[73] Assignee: Kohjin Co., Ltd., Tokyo, Japan

[21] Appl. No.: 364,396

[22] Filed: Dec. 23, 1994

Related U.S. Application Data

[63] Continuation of Ser. No. 117,207, Sep. 16, 1993, abandoned, which is a continuation of PCT/JP93/00046, Jan. 14, 1993.

[30] Foreign Application Priority Data

| Jan. 16, 1992 | [JP] | Japan | 4-024355 |
| Sep. 9, 1992 | [JP] | Japan | 4-265572 |
| Jan. 14, 1993 | [WO] | WIPO | PCT/JP93/00046 |

[51] Int. Cl.$^6$ ................ B32B 3/00; B32B 7/00; B32B 29/00
[52] U.S. Cl. ............ 428/211; 428/15; 428/207; 428/323; 428/402; 428/411.1; 428/473.5; 428/511; 156/61; 162/146
[58] Field of Search ............ 156/61; 162/126, 162/127, 128, 146, 162, 181.1; 264/25, 73; 428/15, 113, 161, 203, 204, 205, 274, 275, 286, 287, 288, 481, 507, 526, 511, 514, 473.5, 211, 207, 323, 402, 411.1

[56] References Cited

U.S. PATENT DOCUMENTS

| 3,933,558 | 1/1976 | Takahata et al. | 156/209 |
| 4,159,301 | 6/1979 | Buser et al. | 263/331 |
| 4,219,598 | 8/1980 | Noma et al. | 428/161 |
| 4,254,019 | 3/1981 | Kroyer | 260/38 |
| 4,871,503 | 10/1987 | Ishii et al. | 264/248 |
| 4,956,030 | 9/1990 | Baskin | 156/61 |
| 4,983,668 | 1/1991 | Cutter et al. | 525/23 |
| 5,183,600 | 2/1993 | Scher et al. | 264/26 |
| 5,260,006 | 11/1993 | Scher et al. | 264/26 |
| 5,338,584 | 8/1994 | Kubota et al. | 428/15 |

FOREIGN PATENT DOCUMENTS

| 51-11670 | 1/1976 | Japan. |
| 51-77655 | 7/1976 | Japan. |
| 52-6756 | 1/1977 | Japan. |
| 63-162900 | 7/1988 | Japan. |
| 64-40697 | 2/1989 | Japan. |
| 2-18049 | 1/1990 | Japan. |

OTHER PUBLICATIONS

Kubota et al. App. No. 63–169957 Patent Abstract Grp No. MO955, vol. 14, No. 157, Abs Pub. Date Mar. 27, 1990.

*Primary Examiner*—William A. Krynski
*Attorney, Agent, or Firm*—Oliff & Berridge

[57] ABSTRACT

Inorganic or organic particles have been used in the past as paper additives for hot-pressed forms to impart the pattern of granite thereto, but when these are boiled in hot water, for example, an uncountable number of small blisters result, lowering the commercial value of the product; however, according to the present invention it is possible to obtain an additive for forming patterns by grinding to desired particle sizes colored paper which has undergone water-resistance treatment with a thermosetting resin, and by selecting the color of the colored paper, a pattern may be selected as desired having spots of any desired color or size. With patterned paper manufactured by adding these paper additives during the paper manufacturing process, there is no occurrence of the above mentioned blisters and a clear pattern may be formed, and therefore hot-pressed forms utilizing have a natural granite image.

5 Claims, No Drawings

PAPER ADDITIVE FOR HOT-PRESSED FORMS AND HOT-PRESSED FORMS USING IT

This is a Continuation of application Ser. No. 08/117,207 filed Sep. 16, 1993, now abandoned, which is a national stage application of PCT/JP93/0046.

TECHNICAL FIELD

The present invention relates to a paper additive which imparts the spot-like color and pattern of granite, a method for the production thereof, and to hot-pressed forms such as granite-like thermosetting resin decorative sheets obtained by impregnating a thermosetting resin into design paper incorporating the additive and drying it, and then laminating it onto the base material and subjecting the laminate to heating and pressurization, and solid materials obtained by multi-lamination and subjection to heating and pressurization, etc. (hereunder referred to as "hot-pressed forms")

BACKGROUND ART

A paper additive which imparts the color and pattern of granite has been disclosed in Japanese Patent Application Disclosure HEI 2-18049, which relates to an application filed by the present applicant, wherein are illustrated inorganic or organic materials including, for example, colored or colorless inorganic powders such as active carbon powder, black coal powder, coke powder, natural graphite powder, iron oxide powder, etc. and colored synthetic resin powders of nylon, vinyl chloride resin, thermosetting epoxy resin, acryl resin, polyester resin, etc.

In addition, as paper which incorporates paper additives produced by separating printed paper into scale-like bits and scattering them into the surface layer of paper or multilayered paperboard, pattern paper which exhibits a pattern of characters, numerals, symbols, etc. (Japanese Utility Model Law Application Disclosure SHO 63-162900) and pattern paper wherein a water-resistant coating the main component of which is a natural resin or the like is coated onto the surface of the printed portion of paper containing printed characters, etc. and then the bit of paper is scattered in water and incorporated into the paper material dispersion for the surface layer of the paper or paperboard (Japanese Patent Application Disclosure SHO 64-40697) are publicly known.

However, when the decorative paper which exhibits a color and pattern imparted by a paper additive incorporated therein and disclosed in the above mentioned Japanese Patent Application Disclosure HEI 2-18049 is used as a hot-pressed form, the following problems result.

(1) During a 5 hour boiling test in hot water, an uncountable number of blisters appeared, and the occurrence of these blisters were clearly a result of the use of the paper additive.

(2) The kinds of paper additives which may be used are limited, and thus the selection of colors and patterns is restricted. Particularly, because of the relationship between the specific gravities, anti-coagulating properties and paper manufacturing yields of various coloring materials, it has been difficult to exhibit two or more colors as a pattern of spots with a uniform particle size.

Furthermore, when the design paper disclosed in the above mentioned Japanese Utility Model Law Application Disclosure SHO 63-162900 which exhibits a color and pattern imparted by printed paper cut into scale-like bits and incorporated therein is used as a hot-pressed form, the following problems result.

(3) If the scale-like printed paper bits are not added just prior to making the paper, then the color and pattern become blurred due to unraveling of the fibers, and even if added just prior to making the paper, the color and pattern blur due to stirring for dispersion.

(4) Particularly, when further grinding is done in order to make the pattern of granite from the scale-like printed paper bits, the major part thereof cannot maintain the scale-like form, and becomes flocculent or fibrous. Also, even the portion which maintains the scale-like form exhibits fraying of the fibers, and when the bit of paper is immersed and stirred in water, the scale-like form cannot be maintained, making it impossible to exhibit a uniform granite pattern.

Furthermore, concerning the pattern paper disclosed in the above mentioned Japanese Patent Application Disclosure SHO 64-40697, only the printed portion of the scattered printed paper is coated with the water-resistant coating, and therefore the other uncoated portions become frayed into a fibrous state during scattering in the paper making process, while the periphery of the coated portions also become frayed. This printed paper is of a size which allows the original characters or symbols, etc. to be read, that is, for example, about 2–2.5 cm after scattering, but with a method whereby only such printed portions are coated with a water-resistant coating and dispersed in a paper making liquid, when the purpose is granite-like spots of diameter a few $\mu$m to a few mm such as according to the present invention, the spotted pattern thus obtained becomes blurred at the edges, and if the spots are particularly small, the spots themselves become difficult to distinguish, and even if used to form granite spots, natural-looking granite spots cannot be obtained. Also, if paper which is printed and coated in this manner is mechanically preground as in the case of the present invention, the portions not coated with the water-resistant coating are not sufficiently ground, and it cannot be subjected to classification treatment, making it impossible to use it by any method for the purpose according to the present invention.

DISCLOSURE OF THE INVENTION

We the inventors of the present invention, as a result of research conducted to overcome the above mentioned problems, have discovered that by using a paper additive consisting of cut or ground colored paper, it is possible to exhibit a uniform spotted pattern without the occurrence of blisters, and further without unraveling and blurring due to water-resistance, and thus the present invention has been completed.

That is, the present invention relates to a paper additive for hot-pressed forms which imparts the pattern of granite, comprising cut or ground colored paper which has been treated with a thermosetting resin for water resistance, and to a hot-pressed form such as a thermosetting resin decorative sheet and solid materials employing a paper additive for hot-pressed forms which impart said granite pattern.

The paper additive according to the present invention is obtained by cutting or grinding water resistant colored paper which has been coated or impregnated with a thermosetting resin and heated to set.

The above mentioned colored paper is mainly composed of cellulose pulp, inorganic fillers and coloring agents, and is produced by coloring cellulose pulp with a coloring agent such as an organic or inorganic pigment, and then adding a paper making such as an inorganic filler, paper reinforcer, etc., and following the wet process paper making method or a similar method. This type of colored paper is preferably light-fast, and, for example, decorative paper (normally called pattern paper) heretofore in use for thermosetting resin decorative board (for example, melamine resin decorative board, polyester resin decorative board, diacryl phthalate resin decorative board, etc.) are appropriate.

The cellulose pulp to be used in the colored paper mainly imparts a strengthening effect and an effect to retain the inorganic filler, and specific examples thereof include cotton linter pulp, bleached sulfite pulp (NBSP, LBSP), bleached kraft pulp (NBKP, LBKP), dissolved pulp (DP), and the like, while the inorganic filler serves to establish the base color and preferably has good light-fastness, a specific example thereof being titanium oxide.

The coloring agent may utilize one or more pigments, which may be an inorganic pigment such as molybdenum red, bengara, ultramarine blue, etc. or an organic pigment such as an insoluble azo pigment, azo lake pigment, phthalocyanine pigment, triphenylmethane pigment, quinacridone pigment, thioindigo pigment, dioxazine pigment, perinone perylene pigment, isoindolinone pigment, fluorbin pigment, anthraquinone pigment, coupling azo pigment, condensation azo pigment, metal complex salt pigment, etc. In addition, for black, a dye may be used. A spotted pattern of granite may usually be exhibited by a combination of white and black, but a selection of pattern of desired colors is possible with the above mentioned coloring pigments.

As other paper making chemicals for the colored paper, paper reinforcers such as polyamide polyamine epichlorohydrin resin, cationized starch water-soluble carbon resin, melamine resin, polyacrylamide resin, etc. may be used, with chemicals having a particularly high wet paper reinforcing effect being preferred. Also, pH regulators such as aluminum sulfate, sodium aluminate, etc. or high molecular coagulants, etc. may be used.

The thickness of the colored paper is preferably 0.5 mm or less, and if the pattern paper is not particularly thick, then 0.15 mm or less is preferable, and 0.08 mm or less is more preferable. If the thickness is over 0.15 mm, then addition to the paper for hot-pressed forms (pattern paper) is not desirable from the point of view of the hot-pressing process, since the increased bulk leads to unevenness.

The thermosetting resin which imparts water-resistance to the colored paper is most preferably of the same material as the thermosetting resin used for the preparation of a hot-pressed form in the later step, but it is not particularly limited, and it may be of the water-soluble type, water-dispersable type, or organic solvent solution type, and specifically a melamine resin, phenol resin, urea resin, unsaturated polyester resin, epoxy resin, diallyl phthalate resin, alkyd resin, polyimide resin, or the like. A impregnation rate (see Equation 1) is of 20%–80% by weight after drying is appropriate.

$$A = \frac{B-C}{D} \times 100(\%) \qquad \text{[Equation 1]}$$

A: Impregnation rate
B: Weight after impregnation
C: Weight before impregnation
D: Weight after impregnation As a standard for water-resistance, the moisture content defined in Equation 2 may be up to 10%, with after treatment of the colored paper at 60° C., 90% RH for 17 hours. Also, the observation is made of the form of the colored paper when ground and the form of the colored paper which has been ground and, using a Tappi scattering machine, made into a water soluble dispersion containing pulp at a proportion of 3% by weight as the solid content and 10% by weight of ground colored paper with respect to the pulp, and stirred at 1800 rpm for 3 hours and then filtered. The forms which are scale-shaped and have no fraying of the fibers are satisfactory.

$$A' = \frac{B'-C}{D'} \times 100(\%) \qquad \text{[Equation 2]}$$

A': Moisture content rate
B': Weight after high-temperature-high-moisture treatment
C': Weight before high-temperature-high-moisture treatment
D': Weight after high-temperature-high-moisture treatment The colored paper obtained in the manner described above is cut or ground to make a paper additive, and in the case of grinding, it is more effective using a grinder after the paper is cut into small size. The size of cutting is preferably in the range of 5.0 cm×5.0 cm–20.0 cm×20.0 cm. Also, the method of cutting may be with, for example, scissors, a cutter, guillotine or the like, and this is not particularly restricted. The grinder used for grinding may be of any type, and the paper may be ground simply by high-speed stirring with a stirrer equipped with agitating blades and the particle size dispersion may be controlled as desired by adjusting the rotation time and rotation speed. A ground product having the desired particle size dispersion may be obtained through a sieve having different sized pores to adjust the size as wished, but any method may be used. The ground paper bits are scale-shaped with the thickness of paper. The degree of grinding may be varied as desired depending on the pattern of the hot-pressed form, which may be used with a maximum diameter of about 10,000 μm, since a diameter of over 10,000 μm is difficult to manage, and the surface of the manufactured paper becomes rough. In the case of a granite pattern, a diameter in the range of 10–5000 μm is generally preferable.

A paper additive obtained in this manner may also be used for fancy paper and the like, and particularly when used in hot-pressed forms such as thermosetting resin decorative board, solid materials, etc., different from ones which use a paper additive according to the prior art, disclosed in Japanese Patent Application Disclosure HEI 2-18049, and no blisters occur in the hot-pressed forms even during testing of them with 5 hours' boiling in hot water. When using a paper additive according to the prior art blisters often occur, but the cause for this has not been determined. However, it has been hypothesized that, due to poor affinity between the additive and the resin used in the hot-pressed form, air gaps form at the interface with the additive, and the air or moisture in these air gaps gives rise to blisters during swelling and vaporization caused by the boiling for 5 hours. In contrast, when using a paper additive according to the present invention, it is assumed that since its affinity with the resin used in the hot-pressed form is very good, such air gaps do not form and therefore blisters do not occur.

Furthermore, the construction of a paper additive according to the present invention is mainly cellulose pulp, as in the case of pattern paper, and therefore it is retained very well when incorporated into pattern paper.

In addition, a paper additive obtained from colored paper which has been made water resistant maintains its scale-form even upon grinding, and its dispersability in water is also good, and therefore unravelling does not occur even with sufficient stirring for dispersion.

The method for the production of pattern paper incorporating a paper additive according to the present invention may be any publicly known method for the respective hot-pressed forms, for example in the case of solid materials, the method disclosed in Japanese Patent Application Disclosure HEI 2-18049 may be used. That is, the production of the design paper may be by the wet process paper making method, or a similar method, wherein cellulose pulp and an inorganic filler are used along with a paper additive according to the present invention as a main ingredient, which has a color hue which differs from the inorganic filler. Also, in the case of thermosetting resin decorative board, the pattern paper may be produced by the same methods as for the solid material.

BEST MODE FOR CARRYING OUT THE INVENTION

A more concrete explanation of the invention of the present application is provided below with reference to the Examples.

EXAMPLE 1

Using black decorative paper (grade: PM-85-45, basis weight: 45.0 g/m$^2$, thickness 60 μm, product of Kohjin Co. Ltd. (hereinafter referred to as Kohjin) as the colored paper, an impregnating solution containing 1% by weight of a hardening agent added to a water soluble melamine resin (trade name: Nicaresin, product of Nihon Carbite, Inc.) as the thermosetting resin, was impregnated into the colored paper to impregnation rates after drying of 10%, 20%, 40%, 60%, 80% and 90%, after which the paper after drying at 140° C. for 4 minutes was first cut into bits of 5 cm square and then ground with a simple grinder (Toshiba home mixer), passed through a filter, and the paper additives which had nominal sizes in the range of 0.500–0.212 mm as shown in Table 2 were collected and provided for testing.

EXAMPLE 2

In the same manner as in Example 1, except for using white decorative paper (grade: LK-1, basis weight: 35.0 g/m$^2$, thickness 46 μm, product of Kohjin) as the colored paper, paper additives having nominal sizes in the range of 0.500–0.212 mm were obtained and provided for testing.

EXAMPLE 3

Using red decorative paper (grade: PM-210, basis weight: 80.0 g/m$^2$, thickness 100 μm, product of Kohjin) as the colored paper, a hardening agent was added to 1% by weight into a water soluble melamine resin (trade name: Nicaresin, product of Nihon Carbite, Inc.) as the thermosetting resin, and the mixture was impregnated into the colored paper to impregnation rates after drying of 20%, 40%, 60% and 80%, and otherwise the same method as in Example 1 was used to obtain paper additives which had nominal sizes in the range of 0.500–0.212 mm, and these were provided for testing.

EXAMPLE 4

In the same manner as in Example 3, except for using brown decorative paper (grade: PM-53, basis weight: 80.0 g/m$^2$, thickness 96 μm, product of Kohjin) as the colored paper, paper additives having nominal sizes in the range of 0.500–0.212 mm were obtained and provided for testing.

EXAMPLE 5

Using black decorative paper (grade: PM-85-45, basis weight: 45.0 g/m$^2$, thickness 60 μm, product of Kohjin) as the colored paper, the product thereof after drying at 140° C. for 4 minutes was ground with a simple grinder (Toshiba home mixer), to obtain paper additives for testing.

The test for the colored paper in Example 1–4 which was further treated for water resistance and the colored paper in Example 5 above included (1) size of the moisture content after high-temperature, high-moisture treatment at 60° C., 90% RH for 17 hours (see Equation 2), (2) observation of the form after grinding, and (3) using a Tappi macerating machine to prepare into a water dispersion containing pulp at a solid content of 5% by weight and 10% by weight of the ground colored paper with respect to the pulp, stirring the dispersion at 1800 rpm for 3 hours followed by filtering, preparation of sheets or basis weight 125 g/m$^2$ using a TAPPI sheet machine, and final observation of the form; the results of the test are shown in Table 1.

In all of Examples 1–4, the form of the ground paper was scale-like over the impregnation rate range of 20–80%. The products which had an impregnation rate of less than 20% had a fibrous or flocculent form. Also, in the case of those which had an impregnation rate of 80%, the resin adhered slightly to the grinder during grinding, and the ground sheets bound to each other to a small degree. With the impregnation rate reaching 90%, the ground paper and ground bits among the sheets bound to each other to a considerable degree, even polluting the grinder causing trouble. The paper in Example 5 which was not treated for water-resistance (0% impregnation rate) was flocculent and fibrous.

TABLE 1

| Example | Impregnation rate (%) | Moisture content (%) of paper-like material after high-temperature/ high-moisture treatment | Ground paper form | Ground paper bits among sheets |
| --- | --- | --- | --- | --- |
| 1 | 10 | 11.5 | x | x |
|   | 20 | 9.8 | o | ∆ |
|   | 40 | 7.5 | ⊚ | ⊚ |
|   | 60 | 6.2 | ⊚ | ⊚ |
|   | 80 | 6.0 | o | o |
|   | 90 | 5.8 | x | x |
| 2 | 10 | 10.5 | x | x |
|   | 20 | 9.1 | o | ∆ |
|   | 40 | 7.6 | ⊚ | ⊚ |
|   | 60 | 6.0 | ⊚ | ⊚ |
|   | 80 | 6.0 | o | o |
|   | 90 | 5.9 | x | x |
| 3 | 20 | 8.9 | o | ∆ |
|   | 40 | 7.8 | ⊚ | ⊚ |
|   | 60 | 5.7 | ⊚ | ⊚ |
|   | 80 | 5.9 | o | o |
| 4 | 20 | 9.2 | o | ∆ |
|   | 40 | 7.7 | ⊚ | ⊚ |
|   | 60 | 6.2 | ⊚ | ⊚ |
|   | 80 | 6.1 | o | o |
| 5 | 0 | 15.0 | x | Impossible to evaluate due to fibers. |

Evaluation of ground paper form and ground paper bit form among sheets
⊚ : Excellent scale-like form (practically no fraying of fibers)
o : Good scale-like form (slight fraying of fibers with a small degree of impregnation; slight adherence between ground paper with a large degree of impregnation)
∆: Generally good scale-like form (some fraying of fibers, some fibrous form present)
x: Poor scale-like form (almost all flocculent and fibrous with a small degree of impregnation. Adherence between ground paper with large degree of impregnation)

EXAMPLE 6

Using 5 g of black decorative paper (grade: PM-85-45, basis weight: 45.0 g/m², thickness 60 μm, product of Kohjin) as the colored paper, a melamine resin (trade name: Nicaresin, product of Nihon Carbite, Inc.) was used alone as the thermosetting resin, an impregnation solution containing no setting agent was impregnated to an impregnation rate of 40%, and then dried at 140° C. for 4 minutes, cut into bits about 5 cm×5 cm and then ground with a simple grinder (Toshiba home mixer) two times, first at a rotational speed of approximately 14,000 rpm for 20 seconds and then at a rotational speed of approximately 19,000 rpm for 5 minutes, and then the particle size distribution was measured with a sieve. The particles classified by the particle size measurement were mixed again, and then mixed with the pulp (about 5% concentration) in a Tappi macerating machine to prepare a water dispersion which was stirred at 1800 rpm for 3 hours, after which it was filtered and the presence of frayed fibers, flocculence and fibrousness of the ground paper was determined.

EXAMPLE 7

The method in Example 6 was followed, except that as the thermosetting resin was used a melamine resin (trade name: Nicaresin, product of Nihon Carbite, Inc.) containing 1% by weight of a setting agent.

The results of Example 6–7 above are shown in Table 2.

TABLE 2

| Mesh size of sieves | Nominal size (mm) | Particle size distribution (% by weight) | | | |
|---|---|---|---|---|---|
| | | Example 6 | | Example 7 | |
| | | 14000 rpm 20 s. | 19000 rpm 5 m. | 14000 rpm 20 s. | 19000 rpm 10 m. |
| <4 | >4.750 | 77.5 | | 13.9 | |
| 4–8.6 | 4.750–2.000 | 13.6 | | 23.1 | |
| 8.6–10 | 2.000–1.700 | 1.0 | | 11.2 | |
| 10–12 | 1.700–1.400 | 3.9 | | 16.9 | |
| 12–16 | 1.400–1.000 | 1.9 | 30.8 | 11.2 | 0.5 |
| 16–32 | 1.000–0.500 | 1.0 | 29.2 | 20.3 | 16.2 |
| 32–42 | 0.500–0.355 | 0.2 | 11.3 | 1.2 | 18.4 |
| 42–65 | 0.355–0.212 | | 16.3 | 2.2 | 44.1 |
| 65–170 | 0.212–0.088 | | 10.1 | | 17.8 |
| 170–400 | 0.088–0.037 | | 2.0 | | 3.0 |
| Form determined after stirring in Tappi macerating machine | | Scale-like | Scale-like | Scale-like | Scale-like |

EXAMPLE 8

The method in Example 7 was followed, except that the impregnation rate was 10%.

EXAMPLE 9

Using 5 g of black decorative paper (grade: PM-85-45, basis weight: 45.0 g/m², thickness 60 μm, product of Kohjin) as the colored paper, and it was then dried at 140° C. for 4 minutes, cut into bits about 5 cm×5 cm and then ground with a simple grinder (Toshiba home mixer, rotation time: 1 minute) two times, first at a rotational speed of approximately 19,000 rpm for 20 seconds and then at a rotational speed of approximately 19,000 rpm for 1 minute, and upon sifting the particle size distribution was determined.

The results of Example 8–9 are shown in Table 3.

As shown in Tables 2 and 3, by varying the rotation time and speed, it is possible to produce paper additives having a variety of particle size distributions. Furthermore, after separating the particles by sieve, any desired particle size distribution may be obtained again by blending. However, with an impregnation rate of the resin of 10% after drying, the paper additive was scale-shaped after stirring in water with the Tappi macerating machine, even upon varying the rotation speed and time, although fraying was extensive and the paper additive was flocculent and fibrous. Also, the non-impregnated resin had extensive fraying of the scale-like form at the time of measuring of the particle size.

TABLE 3

| Mesh size of sieves | Nominal size (mm) | Particle size distribution (% by weight) | | | |
|---|---|---|---|---|---|
| | | Example 8 | | Example 9 | |
| | | 14000 rpm 20 s. | 19000 rpm 5 m. | 14000 rpm 20 s. | 19000 rpm 10 m. |
| <4 | >4.750 | 90.5 | 82.5 | Some scale shapes of about 5–2 mm, but extensive fraying of fibers. | No scale shapes. Extensive flocculence and fibrousness |
| 4–8.6 | 4.750–2.000 | 5.3 | 8.6 | | |
| 8.6–10 | 2.000–1.700 | 1.9 | 4.0 | | |
| 10–12 | 1.700–1.400 | 2.3 | 3.9 | | |
| 12–16 | 1.400–1.000 | | 1.0 | | |
| 16–32 | 1.000–0.500 | | | | |
| 32–42 | 0.500–0.355 | | | | |
| 42–65 | 0.355–0.212 | | | | |
| 65–170 | 0.212–0.088 | | | | |
| 170–400 | 0.088–0.037 | | | | |
| Form determined after stirring in Tappi macerating machine | Large degree of fiber fraying, or flocculence and fibrousness. | | | | |

EXAMPLE 10

Forty parts by weight of cotton linter pulp as a cellulose pulp, 20 parts by weight of chopped strands of long glass fiber (average fiber diameter: 6 μm, average fiber length: 6 mm) as a artificial fiber, 25 parts by weight of aluminum hydroxide (trade name: Hydirite H-32, average particle size: 3.2 μ, product of Showa Denko, Inc.) as an inorganic filler and 2 parts by weight of titanium oxide (average particle size: 0.3 μ) were dispersed in water with 8 parts by weight either of the black colored paper additives prepared in Examples 1 and 5 with impregnation rates of 0, 20, 40, 60 and 80%, respectively, as a paper additive, and 1.5 parts by weight of a melamine resin paper reinforcer was added to each of the resulting water dispersions, and then the pH was adjusted to 5.5. Using these adjusted solutions, and a Tappi sheet machine (round paper machine for making paper by hand) was employed to prepare 6 different types of pattern paper having different paper additives with a basis weight of 120 g/m².

Into this obtained pattern paper was impregnated 50% by weight of a water-soluble melamine resin (trade name: Nicaresin, product of Nihon Carbite, Inc.) to an impregnation rate of 52% (basis weight 250 g/m² after impregnation and drying), and the paper was dried. Sixteen sheets of the same material were layered and pressed at a temperature of 130° C. and a pressure of 80 kg/cm² for 30 minutes, to obtain a granite patterned solid material of thickness 3 mm.

EXAMPLE 11

Eighty-five parts by weight of bleached sulfite pulp (NBSP) as a cellulose pulp, 15 parts by weight of chopped strands of long glass fiber (average fiber diameter: 6 μm, average fiber length: 6 mm) as a artificial fiber, 30 parts by weight of magnesium hydroxide (average particle size: 0.2 μ) as an inorganic filler, 10 parts by weight of silica powder (average particle size 3 μ) and 3 parts by weight of titanium oxide (average particle size: 0.3 μ) were dispersed in water with 3 parts by weight either of the black colored paper additives prepared in Examples 1 and 5 with impregnation rates of 0, 20, 40, 60 and 80%, respectively, as a paper additive, and 3.0 parts by weight of a polyamide polyamine epichlorohydrin resin was added to each of the resulting water dispersions, and then the pH was adjusted to 5.5. Using these adjusted solutions, a Tappi sheet machine (round paper machine for making paper by hand) was employed to prepare 6 different types of pattern paper having different paper additives with a basis weight of 120 g/m$^2$.

Into this obtained pattern paper was impregnated 50% by weight of a water-soluble melamine resin (trade name: Nicaresin, product of Nihon Carbite, Inc.) to an impregnation rate of 52% (basis weight 250 g/m$^2$ after impregnation and drying), and the paper was dried. Thirty-two sheets of the same material were layered and pressed at a temperature of 130° C. and a pressure of 80 kg/cm$^2$ for 30 minutes, to obtain a granite patterned solid material of thickness 6 mm.

Comparison 1

The same method as in Example 10 was followed, except that artificial graphite powder (particle size range: 20–200 μm, average particle size: 50 μm) was used as the paper additive with thermosetting epoxy resin powder (trade name: Allon powder E-100, average particle size 60 μm, product of Toa Gosei Kagaku Kogyo, Inc.), to obtain a granite patterned solid material of thickness 3 mm.

Comparison 2

The same method as in Example 11 was followed, except that artificial graphite powder (particle size range: 20–200 μm, average particle size: 50 μm) was used as the paper additive with thermosetting epoxy resin powder (trade name: Allon powder E-100, average particle size 60 μm, product of Toa Gosei Kagaku Kogyo, Inc.), to obtain a granite patterned solid material of thickness 6 mm.

A sample sheet of 5 cm square was taken from the solid material obtained in Examples 10 and 11 and Comparisons 1 and 2, for a 5 hour boiling test in hot water. The results were that the samples from Examples 10 and 11 exhibited absolutely no blisters, while those from Comparisons 1 and 2 exhibited blisters, with those from Comparison 1 being particularly extensive.

Furthermore, upon observation of the design of the solid material of Examples 10 and 11, the paper additives which had undergone water-resistance treatment and had an impregnation rate of 20–80% imparted a uniform pattern of clear spots of uniform size to the entire solid material, whereas those with an impregnation rate of 10% or 0% had more blurred spots, and a non-uniform pattern, compared to those with a 20%–80% impregnation rate. Particularly, with an impregnation rate of 0%, the granite pattern was almost shaded off.

EXAMPLE 12

The same method as in Example 10 was followed, except that as the paper additives were used 8 parts by weight of the black paper additive in Example 1 having an impregnation rate of 40% and a nominal size of 500 μm–1000 μm, 4 parts by weight of the white paper additive in Example 2 having a resin impregnation rate of 40% and a nominal size of 212–355 μm, and 2 parts by weight of the brown paper additive consisting of the brown colored paper used in Example 4 which was treated for water-resistance to an impregnation rate of 40% and ground to an average particle size of 50 μm, to obtain a granite patterned solid material of thickness 3 mm.

The above mentioned sheets were cut to 5 cm square and used in a 5 hour boiling test in hot water, and there was absolutely no blistering. Furthermore, the spotted pattern exhibited the respective clear, uniform colors. Also, since the black portions of the granite pattern were enlarged and white and brown portions had been added, as a design this was more preferable than with the single type of paper additive in Example 10, etc.

EXAMPLE 13

The same method as in Example 10 was followed, except that as the paper additives were used 4 parts by weight of the black paper additive in Example 1 having an impregnation rate of 40% and a nominal size of 500 μm–1000 μm, and 4 parts by weight of the black paper additive in Example 5 which had not been treated for water resistance, to obtain a granite patterned solid material of thickness 3 mm.

The above mentioned sheets were cut to 5 cm square and used in a 5 hour boiling test in hot water, and there was absolutely no blistering. Furthermore, the design was a spotted pattern containing a mixture of clear black spotted portions and blurry black spotted portions.

EXAMPLE 14

The same method as in Example 10 was followed, except that as the paper additive was used 4 parts by weight of the red paper additive in Example 3 having an impregnation rate of 40% and a nominal size of 500 μm–1000 μm, to make pattern paper. Next, into this obtained pattern paper was impregnated 50% by weight of a water-soluble melamine resin (trade name: Nicaresin, product of Nihon Carbite, Inc.), and the paper was dried to obtain patterned paper.

Next, successive layering was made of a melamine resin-impregnated overlay paper, the above mentioned patterned paper, and a phenol resin core paper (3 sheets), after which the sheets were shaped by hot pressing to obtain thermoset resin decorative sheets.

The above mentioned sheets were cut to 5 cm square and used in a 5 hour boiling test in hot water, and there was absolutely no blistering. Furthermore, clear read spots of uniform size provided a uniformly dispersed pattern.

INDUSTRIAL APPLICABILITY

A paper additive according to the present invention is useful for exhibiting a spotted pattern design, particularly that of granite, in hot-pressed forms, and is appropriate for exhibiting spotted patterns which require multiple colors and sizes. Furthermore, a form could be obtained which produced no blisters even upon boiling it in hot water. Also, since no special materials are required, and the broke produced during the paper manufacturing process may be utilized, it is advantageous from an industrial point of view.

We claim:

1. An artificial laminate produced by impregnating a colored paper with from 20–80% by weight of a first thermosetting resin; thermosetting said first thermosetting resin cutting or grinding said impregnated colored paper into chips; preparing sheets of paper which incorporate said chips, wherein said chips create a granite pattern on the surfaces of said sheets of paper; impregnating said patterned sheets of paper with a second thermosetting resin; drying said impregnated patterned sheets of paper; and hot-pressing at least two of said dried sheets of patterned paper.

2. The artificial laminate according to claim 1, wherein the chips have a diameter of 10 μm to 5,000 μm.

3. The artificial laminate according to claim 1, wherein the chips have a diameter of 10 μm to 10,000 μm.

4. The artificial laminate according to claim 1, wherein the colored paper is impregnated at an impregnation range of 40–60%.

5. An artificial laminate comprising a plurality of paper sheets hot-pressed together, wherein said paper sheets comprise:

a) paper additive particles comprising colored paper and a first thermosetting resin, wherein said paper additive particles are obtained by impregnating colored sheets of paper with from 20–80% by weight of said first thermosetting resin; thermosetting said colored sheets of paper and said first thermosetting resin; and cutting or grinding said colored sheets of paper, wherein said colored sheets of paper and said first thermosetting resin are thermoset in order to make the paper particles more rigid; and b) a second thermosetting resin, wherein said plurality of sheets are impregnated with said second thermosetting resin prior to being hot-pressed together.

* * * * *